US009703832B2

(12) United States Patent
Bauchot et al.

(10) Patent No.: US 9,703,832 B2
(45) Date of Patent: Jul. 11, 2017

(54) METHOD, SYSTEM AND COMPUTER PROGRAM TO PROVIDE FARES DETECTION FROM RULES ATTRIBUTES

(75) Inventors: Jérôme Bauchot, Antibes (FR); David Dufour, Cannes (FR); Frederic Lobello, Saint Laurent du Var (FR); Muriel Becker, Grasse (FR)

(73) Assignee: Amadeus S.A.S., Biot (FR)

( * ) Notice: Subject to any disclaimer, the term of this patent is extended or adjusted under 35 U.S.C. 154(b) by 0 days.

(21) Appl. No.: 12/932,950

(22) Filed: Mar. 9, 2011

(65) Prior Publication Data
US 2012/0215569 A1 Aug. 23, 2012

(30) Foreign Application Priority Data

Feb. 18, 2011 (EP) ..................................... 11305170

(51) Int. Cl.
*G06Q 10/10* (2012.01)
*G06F 17/30* (2006.01)
*G06Q 10/02* (2012.01)

(52) U.S. Cl.
CPC ....... *G06F 17/30445* (2013.01); *G06Q 10/02* (2013.01)

(58) Field of Classification Search
CPC .. G06Q 10/02; G06Q 10/10; G06F 17/30395; G06F 17/30445
USPC ...................................... 705/5; 707/E17.014
See application file for complete search history.

(56) References Cited

U.S. PATENT DOCUMENTS

| | | | | |
|---|---|---|---|---|
| 5,864,822 A | * | 1/1999 | Baker, III | 705/14.36 |
| 8,126,783 B2 | * | 2/2012 | Steeb et al. | 705/26.64 |
| 8,224,829 B2 | | 7/2012 | Pauly | |
| 2003/0036930 A1 | | 2/2003 | Matos et al. | |

(Continued)

FOREIGN PATENT DOCUMENTS

| | | |
|---|---|---|
| CN | 1998014 | 7/2007 |
| CN | 101504652 | 8/2009 |

(Continued)

OTHER PUBLICATIONS

Oracle® Database—Rules Manager and Expression Filter Developer's Guide; Apr. 2010; 11g Release 2 (11.2); E14919-03; 198 pages.*

(Continued)

*Primary Examiner* — Shannon Campbell
*Assistant Examiner* — Freda A Nelson
(74) *Attorney, Agent, or Firm* — Thompson Hine LLP

(57) ABSTRACT

In one aspect thereof the exemplary embodiments provide a data processing system that includes at least one data processor; at least one memory connected with the data processor and that stores computer software that is executable by the at least one data processor; at least one database storing a plurality of fares and rules establishing conditions under which at least one of the fares can be applied; and an interface to at least one user and configured to receive from the user a fare inquiry. The data processor is configured with the computer software to cause the data processing system to receive a fare inquiry that contains at least one rule attribute, to perform a first search to determine rule data applicable to the at least one rule attribute, and to perform a second search using the rule data to retrieve a list of fares that are applicable to the rule data.

13 Claims, 13 Drawing Sheets

(56) References Cited

U.S. PATENT DOCUMENTS

| | | | |
|---|---|---|---|
| 2005/0033616 | A1 | 2/2005 | Vavul et al. |
| 2005/0149344 | A1* | 7/2005 | Wachholz-Prill ...... G06Q 10/06 705/348 |
| 2008/0097954 | A1 | 4/2008 | Dutta et al. |
| 2009/0150343 | A1* | 6/2009 | English .............. G06Q 30/0603 |
| 2010/0010978 | A1 | 1/2010 | Carapella et al. ................ 707/4 |
| 2010/0042603 | A1* | 2/2010 | Smyros ............ G06F 17/30675 707/711 |
| 2012/0029955 | A1* | 2/2012 | Daughtrey ............. G06Q 10/02 705/5 |

FOREIGN PATENT DOCUMENTS

| | | | |
|---|---|---|---|
| EP | 2079043 | A1 * | 7/2008 |
| FR | EP 2079043 | A1 * | 7/2009 ............ G06Q 10/02 |
| JP | 2005522752 | | 7/2005 |
| JP | 2006146439 | | 6/2006 |
| JP | 2007257669 | | 10/2007 |
| JP | 2009080833 | | 4/2009 |
| JP | 2010507172 | | 3/2010 |
| JP | 20100507172 | | 3/2010 |
| WO | 2007049388 | | 5/2007 |
| WO | WO 2009/073489 | A1 | 6/2009 |

OTHER PUBLICATIONS

European Patent Office, International Search Report and Written Opinion issued in International Application No. PCT/EP2012/052670 dated Mar. 27, 2012.
The International Bureau of WIPO, International Preliminary Report on Patentability issued in Interantional Application No. PCT/EP2012/052670 dated Aug. 21, 2013.
European Patent Office, Official Action issued in Application No. 11 305 170.0-1951 dated Sep. 30, 2013.
European Patent Office, Search Report issued in Application No. 11 305 170.0-1225 dated Aug. 5, 2011.
IP Australia, Examination Report issued in Patent Application No. 2012217093 dated Oct. 7, 2014.
CN, First Office Action and Search Report; Chinese Patent Application No. 201280009144.2 (Jan. 28, 2016).
Japan Patent Office, Official Action issued in Application No. 2013-553941 and English translation thereof Jul. 5, 2016.
Japanese Patent Office, Office Action issued in corresponding Application No. 2013-553941, dated Jan. 18, 2016.

* cited by examiner

METHOD, SYSTEM AND COMPUTER PROGRAM TO PROVIDE FARES DETECTION FROM RULES ATTRIBUTES

TECHNICAL FIELD

The exemplary embodiments of this invention relate generally to computerized reservation systems and methods, such as those used for making airline reservations and, more specifically, relate to techniques for detecting and retrieving fares.

BACKGROUND

The following abbreviations are defined as follows:
ATPCo Airline Tariff Publishing company
GDS Global Distribution System
IATA International Airline Transport Association
OLTA Online Travel Agencies
PNR Passenger Name Record
The following terms are defined as follows.
Fare A set of information giving the price of a travel from a given origin location to a destination location. The Fare may also be referred to as a Fare Entity.
Fare Key Identifying fields of the Fare.
Rule Set of conditions under which a Fare may apply. A Rule may also be referred to as a Rule Entity.
Record1 Fare Application entity: a set of data that complement the Fare and describe the exploitation criteria of the Fare (e.g., the day of the week or the season when the Fare is valid). To one given Record1 may correspond m Fares, each of them inheriting from the exploitation criteria defined in the Record1.
Record2 Rule Category (Seasonality, Minimum stay, etc.)
Record3 Rules Provision: data/value used by the Rule Category (e.g., for the Seasonality Rule Category, a Rule Provision may be 'Summer').
FareRec1 Fare with additional Record1 information The purpose of a Fare quotation is to provide a user with tariffs for certain itineraries. Such tariffs are computed based on Fares and Rules entities as defined above.

As is shown in FIG. 1 a standard Fare quotation provides an informative display context that is accomplished using input data. These input data can be classified as follows:

Itinerary input data (or Itinerary attributes) which are used as search criteria in the Fare quotation and to initiate the process (e.g.: Origin, Destination, Travel Dates, etc.); and Restrictive input data (or Restrictive attributes) which are used as filter criteria in the Fare Quotation process. The Restrictive attributes can be linked to the traveler (e.g., age, corporate, etc.) and/or to the point of sale that is sending the request.

Currently in the airline industry a Fare quotation process/system first retrieves Fares and then applies the Rules in order to perform the Fare quotation. The application of the Rules allows the system to filter the retrieved Fares. The application of the Rules can be decomposed into three main steps.

The first step involves the retrieval of the Fare Applications and performing a merge operation between the Fares and the corresponding Fare Applications. The Fare Application (also referred to as Record1) is the set of data that complement the Fare and describe the exploitation criteria of the Fare (e.g., the day of the week or the season when the Fare is valid). To one given Record1 may correspond m Fares, each of them inheriting from the exploitation criteria defined in the Record1. Hence, the Record1 contains Fare data that have been factorized, and a Fare cannot exist without its corresponding Record1.

The second step involves the application of the Rule Categories (also referred to as Record2). The Rules Categories can be, for example, Seasonality, Minimum stay, etc. The third step involves the application of the Rule Provisions (also referred to as Record3). The Rules Provisions are the data/values used by the Rule Categories (e.g., for the Seasonality Rule Category a Rule Provision may be 'Summer').

The Rule Categories and Rule Provisions are application rules that depend on the Pricing context, whereas the Fare Application is valid whatever the context. As an example, assume that Fare Y is valid during all days of the week as per its Fare Application. If the quotation of this Fare is done during the Summer, the Rule Category and associated Rule Provisions will restrict its use to the week-end only. Under certain conditions the Fare applies on a restricted area of its Fare Application. As a result, certain common notions can appear in both the Fare Application and Rule Categories/Provisions.

FIG. 2 shows the main steps/elements of a conventional Fare Quotation and Fare Quotation engine. Starting with Itinerary attributes the Fares are retrieved to obtain Fares. The Fare applications are then retrieved and merged with the retrieved Fares. Rule categories are then applied followed by the application of the Rule provisions (in consideration of the Restrictive attributes). The end result is the outputting of the desired Fare(s).

Currently a problem exists in that airlines have no visibility of the impact on the pricing that results from a filing of a Rule or an update of a Rule. As an example, assume that an airline wants to propose a promotion that is valid for all travel within Europe. The airline files a discount in the Rules, but has no way to check that the discount is available in all markets in Europe.

Moreover, OLTA do not have the possibility to see a global view of the Fares having given Rules characteristics. For example, in the Rules it is possible to define the vendors that are authorized to sell certain Fares. However, if there is no communication of these authorizations then the vendors may not be aware, and thus ignore, of the fact that they are allowed to sell these Fares.

SUMMARY

The foregoing and other problems are overcome, and other advantages are realized, in accordance with the embodiments of this invention.

In a first aspect thereof the exemplary embodiments provide a computer-implemented method to retrieve at least one fare. The method includes receiving a fare inquiry that contains at least one rule attribute; performing a first search to determine rule data applicable to the at least one rule attribute; and performing a second search using the rule data to retrieve a list of fares that are applicable to the rule data.

In another aspect thereof the exemplary embodiments provide a data processing system that comprises at least one data processor; at least one memory connected with the data processor and storing computer software that is executable by the at least one data processor; at least one database storing a plurality of fares and rules establishing conditions under which at least one of the fares can be applied and an interface to at least one user and configured to receive from the user a fare inquiry. The data processor is configured with the computer software to cause the data processing system to receive a fare inquiry that contains at least one rule attribute, to perform a first search to determine rule data applicable to the at least one rule attribute, and to perform a second search using the rule data to retrieve a list of fares that are applicable to the rule data.

BRIEF DESCRIPTION OF THE DRAWINGS

The foregoing and other aspects of the embodiments of this invention are made more evident in the following Detailed Description, when read in conjunction with the attached Drawing Figures, wherein.

DETAILED DESCRIPTION

The exemplary embodiments of this invention provide an ability to retrieve base Fares from the Rules attributes, without any Itinerary information or any other fare information, and thus overcome the problems discussed above.

Figure 3:
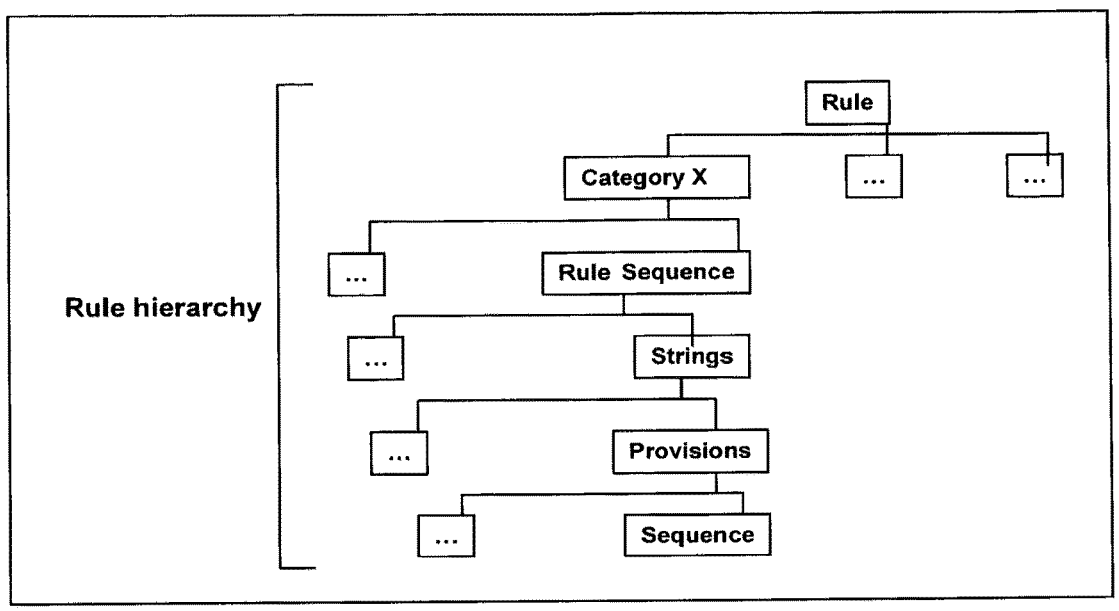
FIG. 3 depicts a rule hierarchy and the organization of the rules.

By way of introduction, FIG. 3 shows an exemplary organization of a Rule. In this representation a Rule hierarchy is shown wherein a certain Rule has certain associated Categories. For a case of a Category X there can be Rule Sequences having associated Strings, which have Provisions which in turn can be represented as a Sequence.

Figure 1:
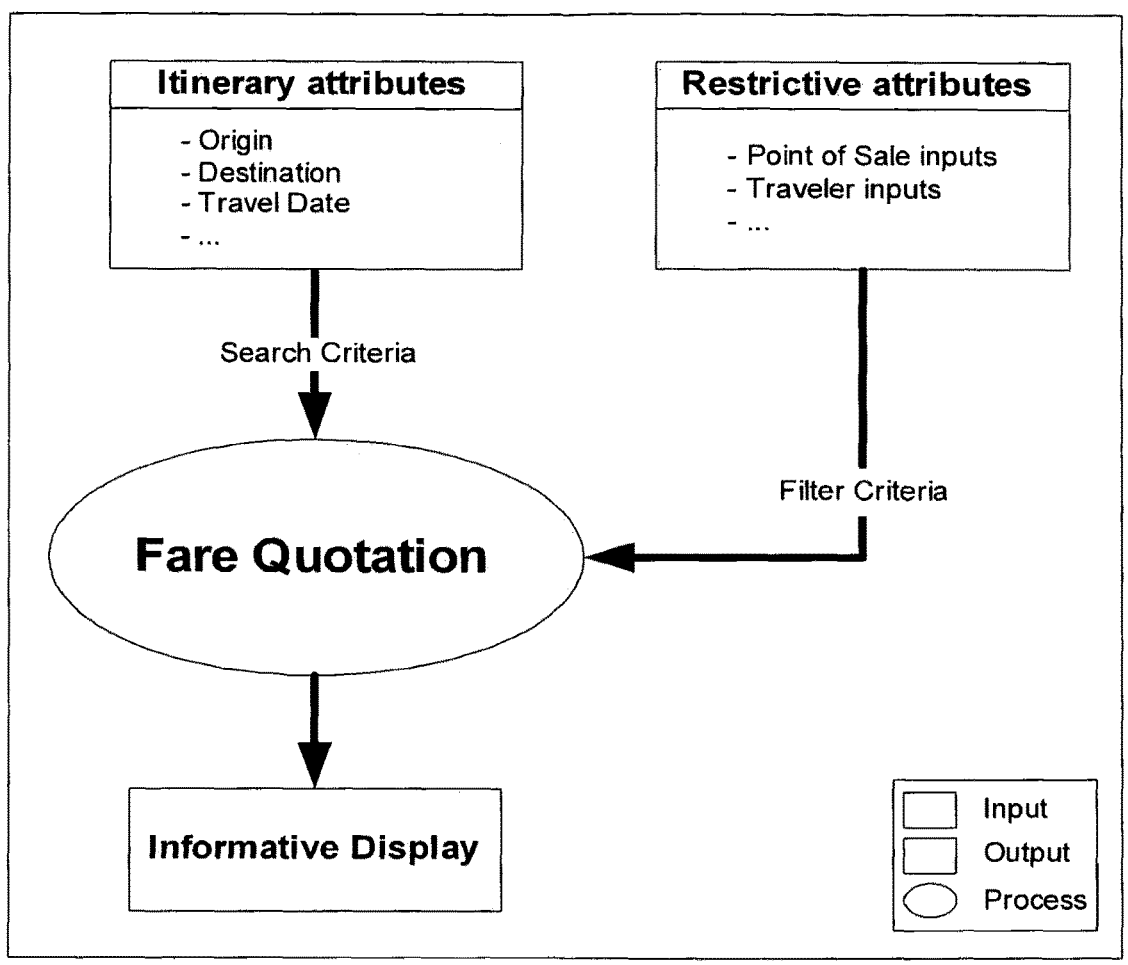
FIG. 1 shows the inputs and outputs of a standard fare quotation.
Figure 2:
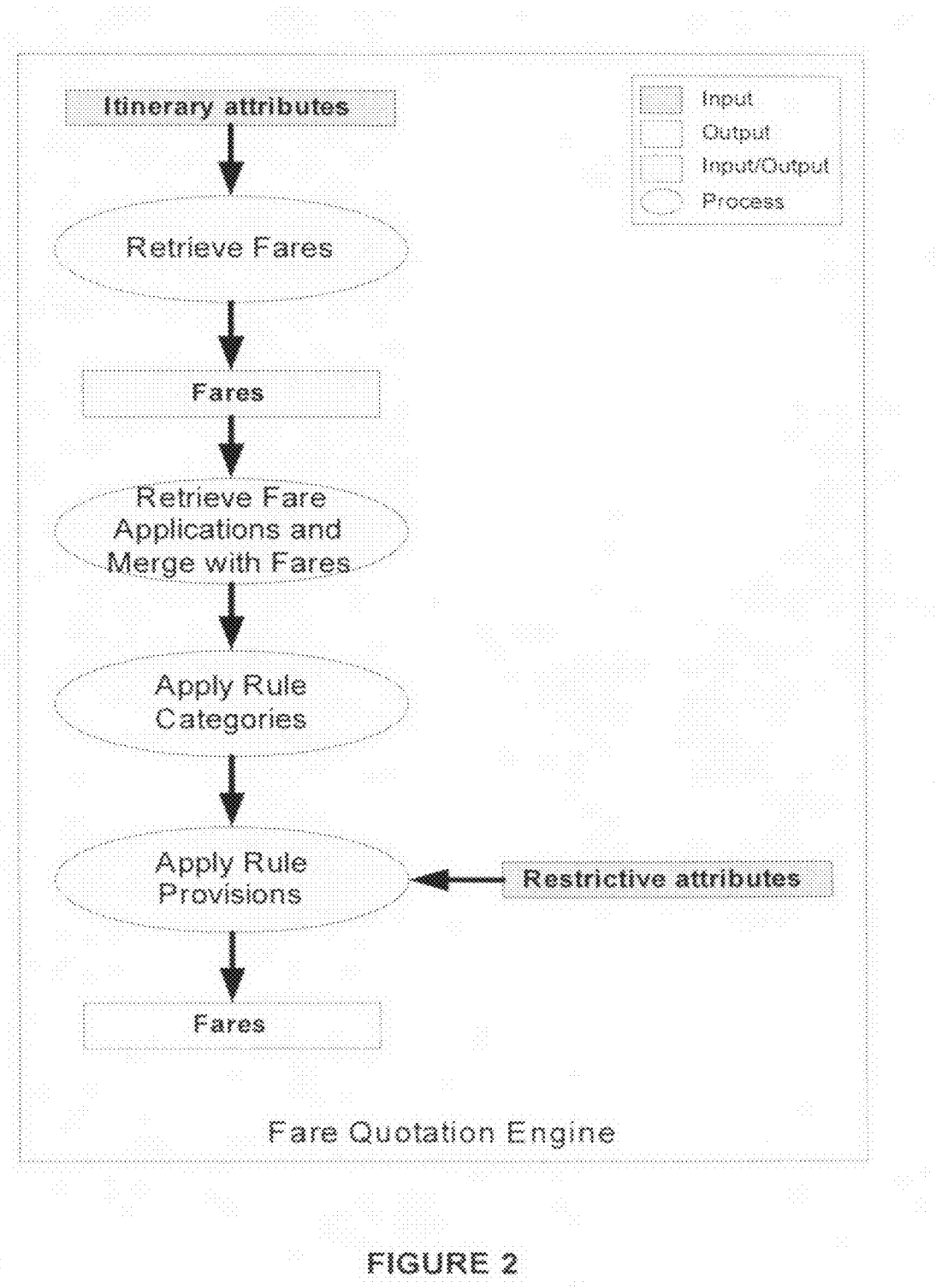
FIG. 2 shows the main steps of the standard fare quotation performed by a fare quotation engine.

Contrary to the conventional standard Fare Quotation shown in FIGS. 1 and 2, the embodiments of this invention use a Rule approach without PNR information in a database environment.

The use of the exemplary embodiments allows an application (a computer-implemented application) to provide a visualization of the Fares impacted by one (or a combination of) Rules attribute(s). The exemplary embodiments thus provide a computer-implemented system and method to enable the identification and/or detection and/or retrieval of at least one Fare based at least in part on predetermined Rules and related Rules attributes.

Figure 4:
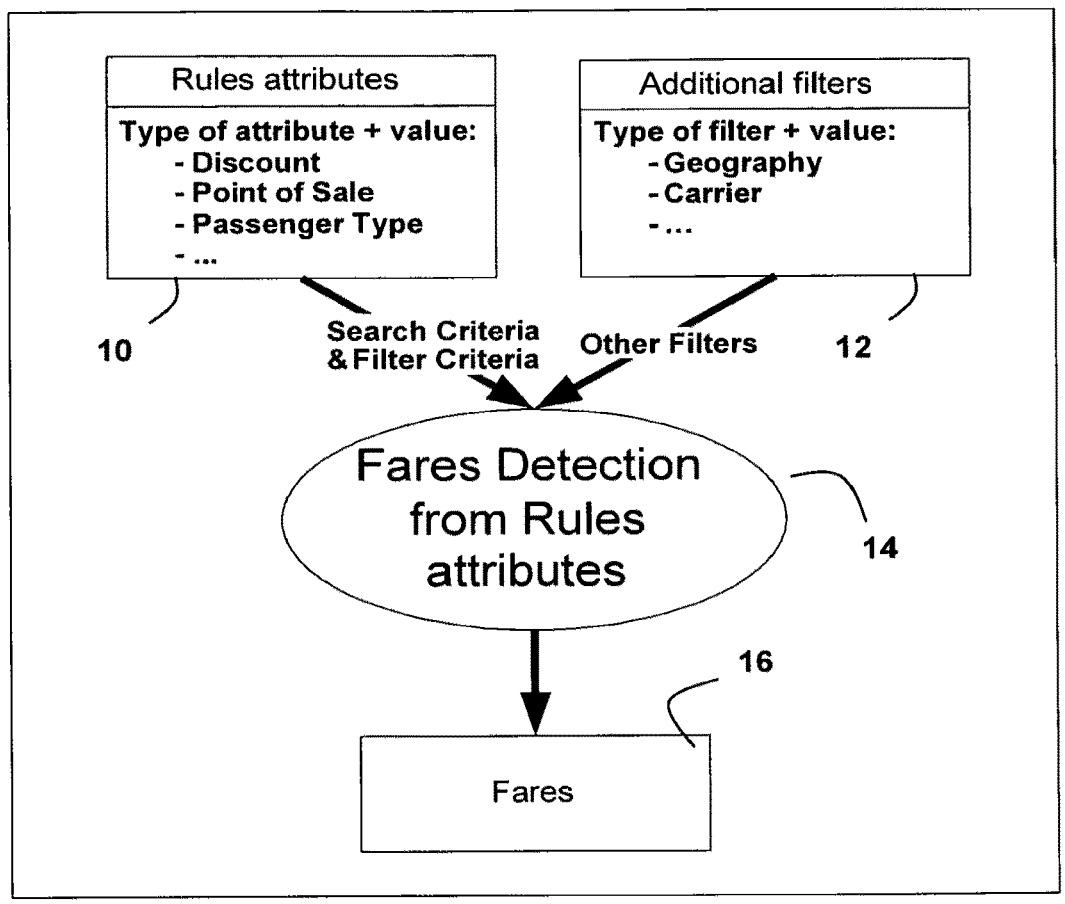
FIG. 4 illustrates the input and output of fares detection from rules attributes.

In operation, and referring to FIG. 4, a user of the application specifies Rules attribute(s) 10 that the user is interested in. The user may also provide one or more additional filters 12 to restrict the view to be obtained. The additional filters 12 can be, for example: the markets in which the user wants to visualize the Fares (by default, all markets can be considered); the publishing carrier(s) of the Fares (by default, Fares from all carriers can be considered); the source of the data to consider (e.g., data only from Amadeus) where, by default, data from any sources are considered; and the validity period to be taken into account when retrieving the data (by default, the validity period can be [current date—indefinitely]).

The Rule attributes 10 (search criteria and filter criteria) and the additional (other) filters 12 are input to a Fares detection from Rules attributes process/engine 14 which outputs in response the desired Fares 16.

The exemplary embodiments of this invention have utility in a number of technical areas and can used as, for example, an auditing tool for both airlines and OLTA, by providing the ability to check the logic of filing and how data are spread on markets. The embodiments thus can be viewed as providing in one aspect thereof a complementary filing tool, used to ease and optimize the filing. The exemplary embodiments can also be used for a catalogue of Fares having given Rules characteristics for OLTA.

The list of Fares 16 identified by the use of the exemplary embodiments of the invention exhibits a number of valuable characteristics. These characteristics include, for example, price coherency, as the applicative logic of the standard Fare Quotation is respected; guaranteed validity, as the process guarantees that the resulting base Fares will not be invalidated by the specified Rules attributes; and exhaustive, as an exhaustive list of Base Fares matching the given Rules attributes is provided. Further, the list of Fares 16 can be provided at an optimized cost in terms of resources usage, and can also be provided with a controllable processing time due to the use of dynamic parallel processing as described in detail below.

The exemplary embodiments resolve a number of complexity-related issues. For example, due to the typically large volume of data to be processed performance issues can arise, at least in terms of processing time and resources usage.

For example, one known type of production database contains, among other data, in excess of 200 million Fares, 3 million Rules Categories and 300 million Rule Provisions of 50 different types. In addition, there is a need to take into account the applicative logic of the standard Fare Quotation for the result to be Pricing coherent.

Other approaches to solving these problems might be attempted, such as by the use of Fare Engines or a Data Warehouse. However, performing pricing transactions is not guaranteed to be exhaustive due to the number of possibilities. Also, it is important to have knowledge of all markets. In the case where but a few samples are obtained the result is not reliable. However, if many samples are obtained in order to be exhaustive then significant processing is needed, which is time consuming and expensive. The Data Warehouse approach is not sufficient due at least to the applicative logic of the standard Fare quotation that has to be applied.

The exemplary embodiments can be used, for example, as an auditing tool. For instance, assume that an airline (carrier) files a promotion to be applied on all travel within Europe. The following information is provided in the input: Rules attributes: the promotion (discount), and additional filters: Geography=Europe and Carrier=airline name. The use of this invention provides in the output the list of airline (carrier) Base Fares in Europe that benefit from the promotion. The airline can thus check and verify that the promotion is well proposed on all markets within Europe, and thus validate their filing.

Another example relates to use to obtain a catalogue of Fares. Assume that a particular OLTA office wants to know all the Fares that they are authorized to sell worldwide. The following information can be provided as input: Rules attributes: the Vendor=the OLTA office identifier, and additional filters: none. The output in this case a list of worldwide base Fares authorized for the OLTA office. In this manner the OLTA office obtains a catalogue of the Fares that the office is authorized to sell worldwide. The exemplary embodiments are now described in further detail with respect to at least the FIGS. 5-14.

Figure 5:
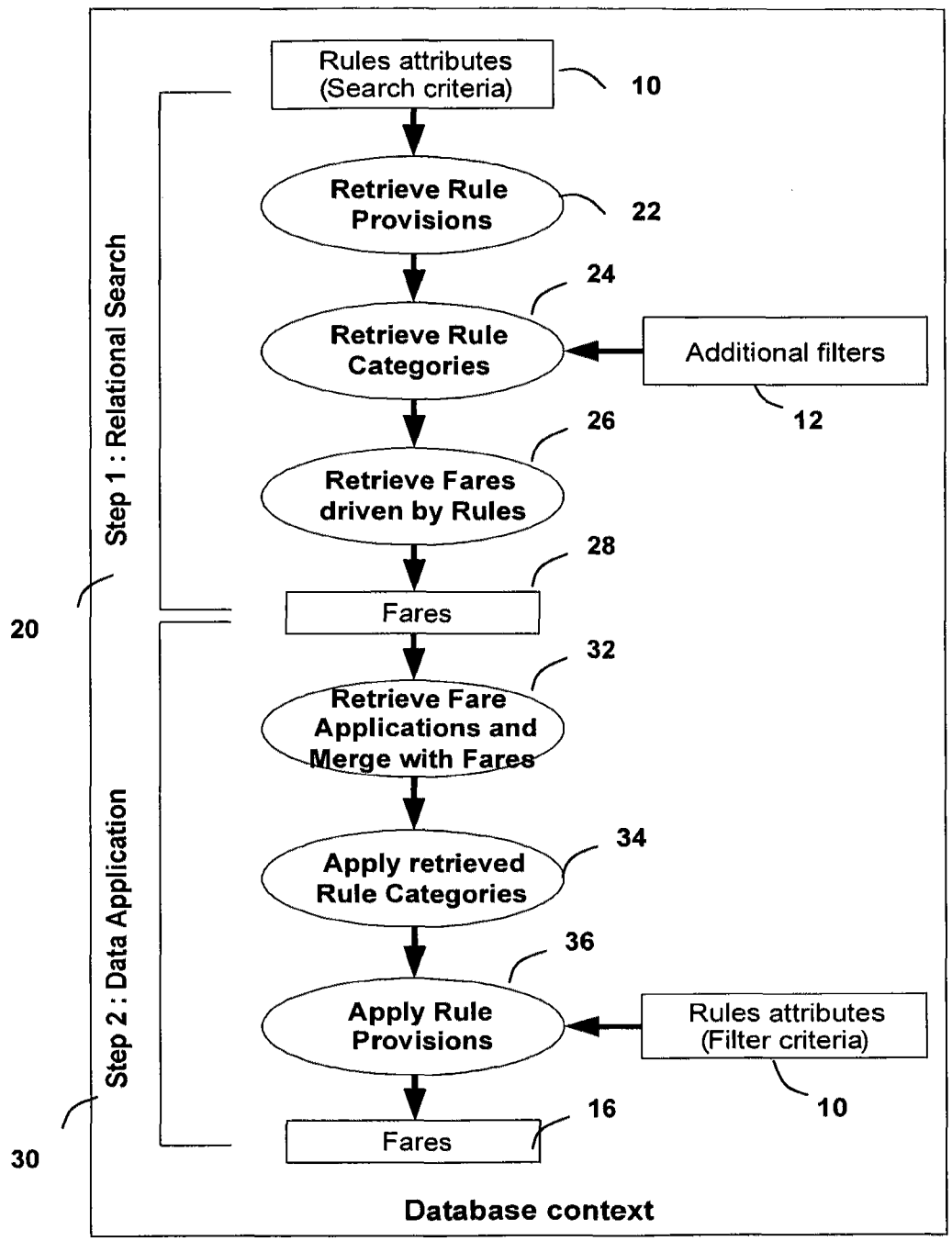
FIG. 5 is a logic flow diagram that illustrates a computer executed process in accordance with the exemplary embodiments of this invention.

FIG. 5 presents an overall functional view of an implementation of the exemplary embodiments of this invention. The process is performed in two main steps at two different levels (macro level and data level). A first step 20 is a relational search step.

In the relational search step 20 the Rule Provisions matching the given Rules attribute(s) 10 are retrieved (22) and scanned. The process operates up to the Fares Keys. At 24 the Rules categories are retrieved based on the additional Filters 12 and at 26 the process retrieves Fares 28 driven by the Rules. The goal of the first step (the relational search step 20) is to retrieve the eligible Fares 28.

A second step 30 is at the data level (data application—filtering step), where the applicative logic of the standard Fare Quotation is applied. In this step retrieved Fare Applications are merged (32) with the Fares 28, the retrieved rule categories 24 are applied at 34, rule provisions are applied at 36 in accordance with the Rules attributes (filter criteria) 10 to yield the final list of Fares 16. A goal of this second step 30 is to check that the identified eligible Fares 28 are not invalidated by the Rules attribute(s) 10 given in the input. It is advantageous to perform the process in the two steps 20 and 30, as there is the need to know the Fares in order to guarantee that they are not invalidated by the Rules attribute(s).

The functional principle described above states that the Fares are identified from attributes located in the Rules. However, starting from the Rules attributes to arrive at the Fares raises the issue related to the volume of data to be treated by the application and the related performances issues at least in terms of processing time and memory space usage. These problems do not arise in the conventional Fare quotation system, as Rules attributes are used as filter criteria, and not as search criteria.

An exemplary implementation is thus provided to address these and other problems related to Fares detection from Rules attributes in a database context with a large volume of data.

Figure 6:
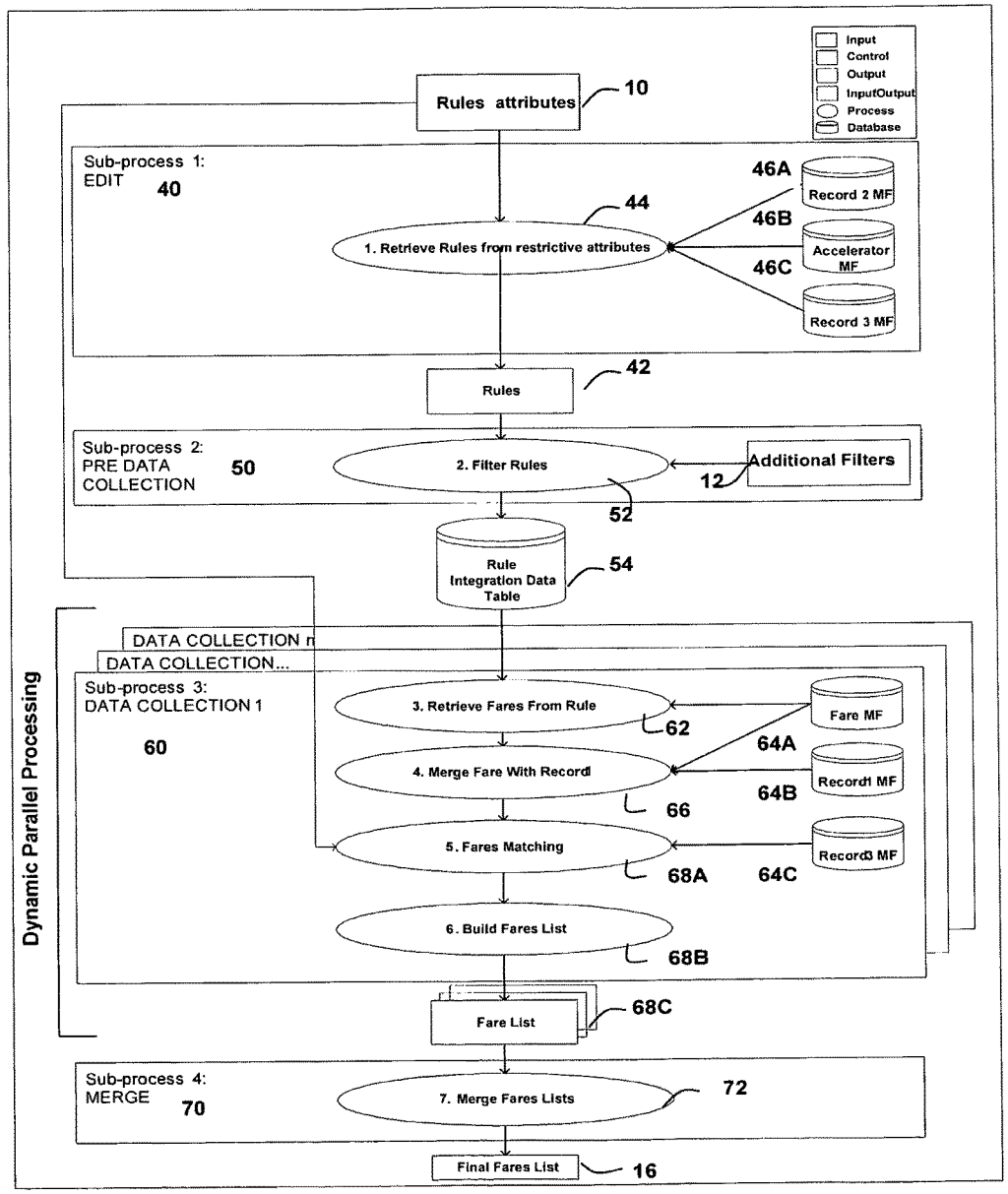
FIG. 6 is an overall view of a technical implementation of fares detection from rules attributes.

In this exemplary implementation, as shown in FIG. 6, the Fares detection from Rules attributes process is divided into four sub-processes, specifically an Edit sub-process 40, a Pre-Data Collection sub-process 50, a Data Collection sub-process 60 and a Merge sub-process 70. These sub-processes are now briefly described in turn.

Edit 40: In this sub-process all of the Rules are collected with selected attributes and stored in a working file 42. This involves retrieving (44) Rules from restrictive attributes based on contents of a plurality of sub-databases (or simply data storage) 44A-44C (Record2-Rule Category, Accelerator, and Record3-Rule Provision, respectively). The Edit sub-process 40 employs a data scanning accelerator based on Cross-Reference tables between Rules and data.

Pre-Data Collection 50: For each previously identified Rule in working file 42, the Rule is filtered (52) against the Input data (Additional filters 12). The result is a Rule integration data table 54.

Data Collection 60: For each previously identified Rule, retrieve the Fares 62. It is at this point that the applicative logic of the standard Fare Quotation is applied. This sub-process preferably employs dynamic parallel processing in combination with intermediate data retrievals and data caching. The Data Collection sub-process 60 uses a plurality sub-databases (or simply data storage) 64A-64C (Fare, Record1-Fare Application entity, and Record3-Rule Provision, respectively). At 66 there is an operation of merging the Fare with Record1, at 68A there is an operation of Fares matching with the Rules attributes 10 and the Record3 (Rule Provision), and at 68B an operation of building a Fares list which is output as Fares list 68C.

Note that these processes are executed in parallel by a plurality of simultaneously executing Data Collection sub-processes 60, and that there are thus a plurality of the Fares Lists 68C, with one being output from each executing Data Collection sub-process 60.

Merge 70: In this sub-processes the plurality of Fares Lists 68C are merged at 72, and the final output is the Fares 16 (see FIG. 4).

The foregoing four sub-processes 40-70 are now described in greater detail. Sub-process 1—Edit 40. The Edit sub-process collects all the Rules data and stores them in the working file 42. The retrieval of the Rules data can be performed using a data scanning accelerator that is described below.

Step 1: Retrieve Rules from restrictive attributes 10. Based on this input a list is obtained of Record2 sequences and data and Record3 data (corresponding to the given Rules attributes). These data are retrieved during this step to avoid multiple database accesses. They are then stored in the working file 42 that is used during the following steps.

Sub-process 2—Pre-Data Collection 50: The Pre-Data Collection sub-process operates such that, for one previously identified Rule, the Rule is filtered against the Input data. Remaining Rules (after filtering) are then stored in a Database 54. Sub-process 2 thus performs Step 2, filter Rules according to Additional filters 12 and remove the Rules that are not applicable.

Sub-process 3—Data Collection 60: The Data Collection process operates such that, for one previously identified Rule, the Fares are retrieved from the Fares database 64A. This sub-process is preferably parallelized in order to optimize the processing time. The parallelization, as well as the intermediate data retrievals and memory caching used during this sub-process, are described in further detail below. This sub-process executes the following steps (in parallel):

Step 3 (Retrieve Fares from Rule) retrieves, from one Record2 sequence, the list of corresponding Fare keys. Additional filters may also apply here.

Step 4 (Merge Fare with Record1) for each remaining Fare key, retrieve the Fare (database 64A) and associated Record1 Data (database 64B), and merge the matching sequences. The resulting entity is referred to as FareRec1.

Step 5 (Fares Matching) take each merged FareRec1 and match it with Record2 and Record3 data from database 64C (corresponding to the given Rules attributes 10). The sub-process then retrieves Record2 data and matches each FareRec1 sequence against Record2 sequences. If the first matching Record2 sequence has been previously identified during Edit and Pre-Data Collection sub-processes 40 and 50, then the FareRec1 is retained.

The sub-process then retrieves Record3 data corresponding to the Record2 and matches the Record3 data against FareRec1 and Rules attributes given in the input. If this data matches then the FareRec1 is retained. If all controls are valid then the retained FareRec1 is stored in the output list.

Step 6 (Build Fares List) builds the Fares list 68C containing Fares that have been validated by the process.

Sub-process 4—Merge 70: The Merge sub-process gathers all the Fares lists 68C generated by the N Data Collection processes and executes step 7 (Merge Fares Lists) which merges all provided Fares Lists 68C by sorting and removing any duplicates.

The performances issue mentioned previously, with respect to the volume of data to be processed (scanned to retrieve the Rule Provisions from the Restrictive attributes), is addressed and solved by the use of the data scanning accelerator that is dynamically built when the data are integrated within the Database. An additional performance issue is related to the retrieved Rule Provisions, which have a data volume of a variable (and unforeseeable) size. Further, one retrieved Rule Provision can lead to a variable volume of Fares (from a few to potentially some millions of Fares). This issue is addressed and solved by using the parallel processing present in the Data Collection sub-process 60, where each of the N Data Collection processes works (simultaneously) on a separate data domain, as well as by the use of intermediate data retrievals and data caches. That is, an aspect of the exemplary embodiments of this invention is that the N Data Collection processes operate on disjoint data sets (domains) which avoids performing redundant operations over the same data.

The processing time and the processing resource usage are controllable, with the possibility to have a balance between both aspects. The volume of data to handle has thus a limited impact on the overall execution.

Figure 7:
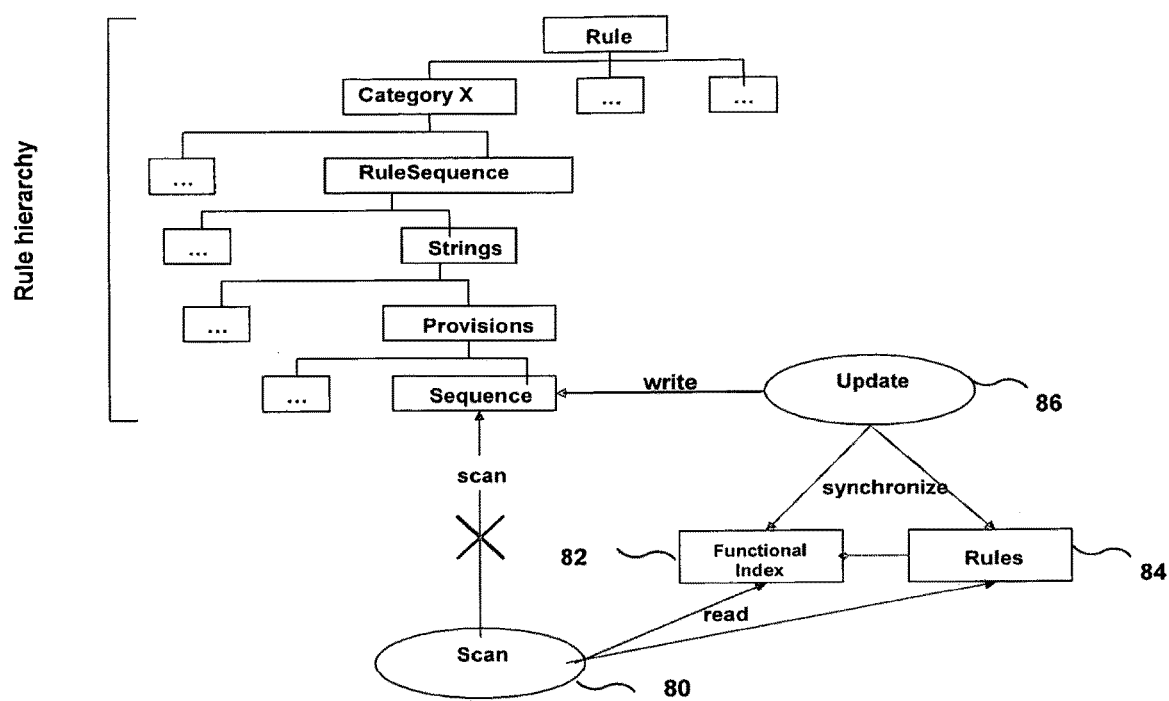
FIG. 7 illustrates a principle of a data scanning accelerator.

Described now in further detail, in reference to FIG. 7, is the data scanning accelerator principle. The Rules (as in FIG. 3) are organized as a tree structure. In the scope of the invention, the leaves of the tree are provided as input (i.e., the Rules attributes) and there is a need to traverse the tree from the leaves to the root (i.e., to the Rules themselves). The operations include scanning 80 to obtain a Functional Index 82 and the Rules 84, and an update 86 that includes a synchronize operation with the Function Index 82 and Rules 84, and a write operation.

The inherent complexity of the Fare quotation process (as defined by the ATPCO) prevents one from using simple indexing techniques (such as relational database indexes) due to the introduction of applicative logic (for example, the combinability of several attributes). The approach in accordance with the exemplary embodiments of this invention enables such capability without deviating from the design of the existing Fare quotation system. The exemplary embodiments employ the insertion of additional sophisticated functional indexes built on Rule-specific attribute sets, thereby enabling the system to easily and efficiently retrieve the related Rules. These indexes contain portions of pre-computed results that act as a pre-check. For example, Rules retrieved from attributes through such an index are potential Rules that next go through the data application process (Step 2 in FIG. 6). Furthermore, Rules not retrieved from attributes through such an index can be known a priori to not be able to pass the data application process of Step 2.

In the preferred embodiments there is one index per attribute set (also called the Functional Index 82). As Rule provisions are organized by category a set of attributes that is a search criteria in the process described herein, and that belong to the same category, is considered for the creation of a new index.

One advantage to the use of this process is that instead of having to scan all the leaves of the Rule hierarchy tree, and then traverse the tree to the Rules root, the data scanning accelerator provides a direct association between the Rules attributes and the Rules (represented by the Rules Cross-References Tables 54 in FIG. 6).

For example, Fares may only be sold by some specific vendors. This type of restriction is coded in a specific Rule category ("Negotiated Fares"—Cat35). Considering vendors as a search criterion, an index built on the miscellaneous fields coding this security allows a fast retrieval of the Rules from a given Vendor.

Based on their type of identification the Vendors can be classified in several ways. Some non-limiting examples of Vendor classifications include:

by geography (security based on the geographical location of the point of sale);

by IATA identification (security based on an identification standardized by IATA); and by GDS proprietary identification (security based on an identification managed by a GDS).

One result of this polymorphism can be a complex decoding phase in order to match a given Vendor identification with the data stored in a category.

Figure 8:
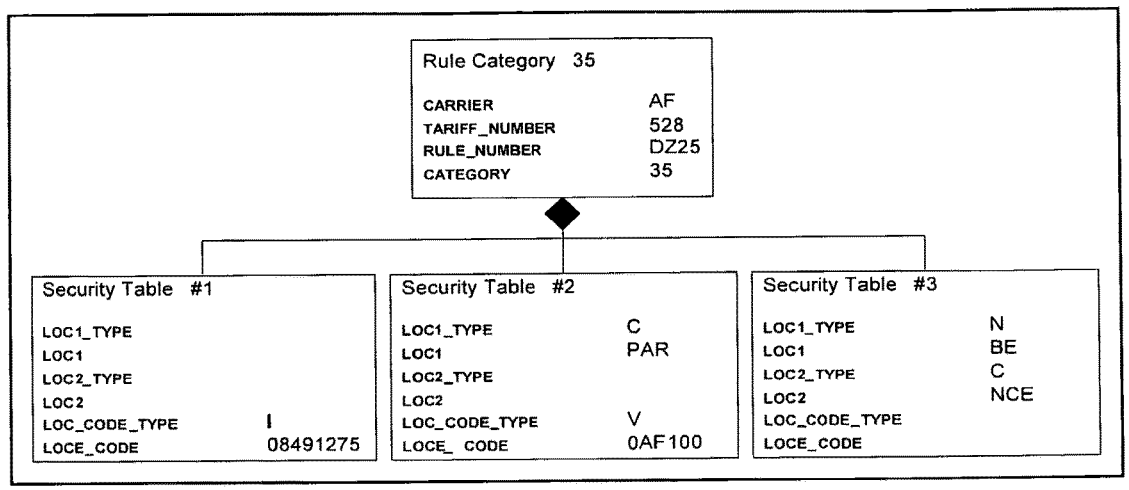
FIG. 8 shows an example of a rule category 35.

FIG. 8 shows an example of Rule Category 35. In this non-limiting example the Rule Category 35 'AF/528/DZ25' contains 3 security tables:

in Security Table #1, an IATA identification is used (IATA number 08491275);

in Security Table #2, a geographic parameter is used (City Paris—C PAR—) along with the vendor code 0AF100. This corresponds to a particular proprietary Vendor identification (office Id 1A 0FRPAR100 for Vendor Amadeus S.A.S. in this case); and in Security Table #3, two geographic parameters are used (Country Belgium—N BE—and City Nice—C NCE—).

As can be appreciated a standard database indexing mechanism would not be very efficient in this case as many fields would require to be indexed, thus consuming storage space and introducing an overhead during updates.

In that the matching is not direct but complex, the system in accordance with the exemplary embodiments does not attempt to retrieve all matching data from a given Vendor. Instead, indexes containing the decoded format suitable to the desired searches to be performed are constructed. These indexes allow a direct match and therefore are much more efficient. Moreover, to avoid having to process a large volume of data a separate index can be constructed for each Vendor, and when a search is performed for a single Vendor only the related index can be used.

Figure 9:
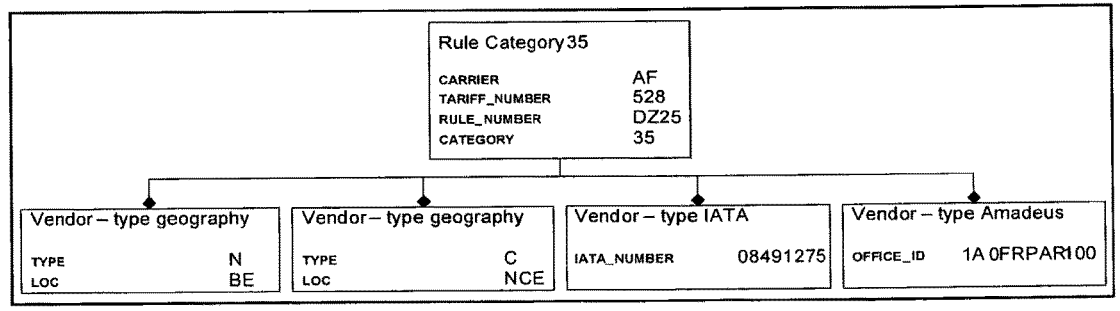
FIG. 9 is an example of an accelerator for rule category 35.

FIG. 9 is a non-limiting example of an accelerator for the Rule Category 35 shown in FIG. 8. For each index entry (there are four shown), all the needed data are stored (here, the identification of the Rule).

The advantages of using this approach are several. For example, no decoding during the search is needed, instead only direct matches need be performed; there is a possibility to use a standard database indexing mechanism; there is a possibility to decompose volumes of data into several indexes; further navigation is avoided by storing all needed data associated with each index entry.

Described now is the principle behind the parallel processing of the Data Collection sub-process 60 shown in FIG. 6. As was explained above, dealing with the volume of data representing the retrieved Rule Provisions (done using the data scanning accelerator described above) can be an important consideration. As a consequence, the total processing time directly depends on the volume of data. So long as the data volume is low the processing time can be acceptable (e.g., several minutes). But when the data volume increases the processing time can extend to be greater than several minutes, which is normally not acceptable. This is true for several reasons. For example, the process is working on Production data, which are likely to change while the process is running. Also by example, when requesting a report the user typically wants to receive the report as soon as possible.

In order to reduce the processing time, parallelization occurs once the Rule Provisions are retrieved. These Rule Provisions are stored in logistic tables 55 (shown in FIG. 11), which associate each data with a status indicating the progression of its processing. Thus, all instances working in parallel do not work on the same data multiple times. Instead, and depending on certain predetermined thresholds 55A shown in FIG. 12A, the process is split into N processes taking as input the data in the logistic tables 55.

As the Rule Provision Key is used to identify each data, and as each Fare and Fare Application correspond to one and only one Rule Provision Key, this guarantees that parallelized instances work on completely separate data domains with no overlap between domains.

An example is now provided in the context of the Vendor (Cat35) as Rules attributes and the four sub-processes 40-70 of FIG. 6.

Figure 10:
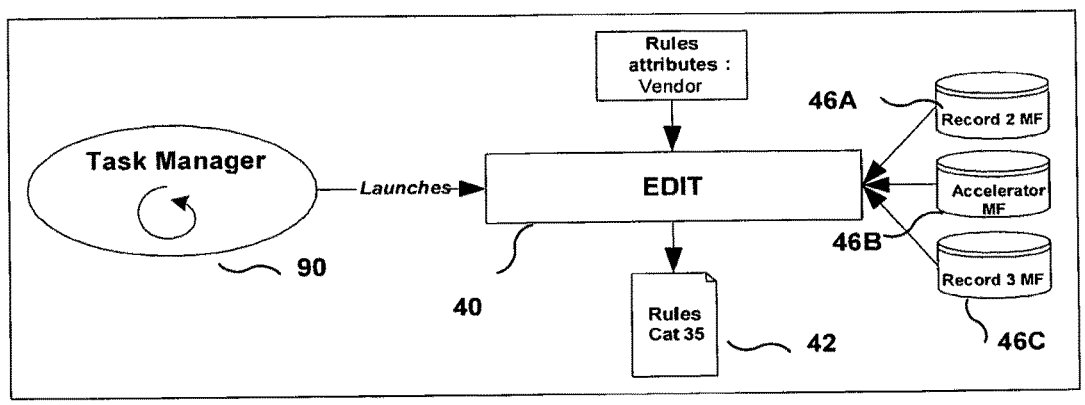
FIG. 10 is a diagram illustrating a launch of an EDIT sub-process.

Referring to FIG. 10, a Task Manager 90 handles the launch and dependencies of the different sub-processes (Edit 40, Pre-Data Collection 50, Data Collection 60 and Merge 70).

Figure 11:
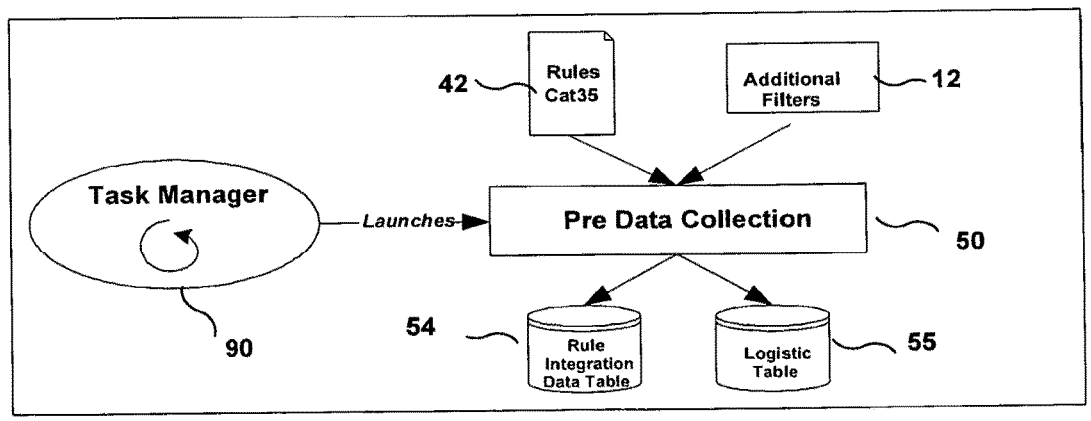
FIG. 11 is a diagram illustrating a launch of a PRE DATA COLLECTION sub-process.

FIG. 10 shows the launch of the sub-process 1 (Edit 40) by the Task Manager 90. Based on the accelerator for Rule Category 35 provided in the example above (FIG. 9), all Rules (list of Record2 Cat35) are obtained and stored in a working file (Rules 42). The Task Manager 90 then re-assumes control from the Edit sub-process 40. FIG. 11 shows the launch of the sub-process 2 (Pre-Data Collection 50) by the Task Manager 90. The list of Record2 Cat35 stored in the working file (Rules 42) is processed into a first table (Rule Integration Data Table 54). At this step some additional filters 12 may apply. The number of Rules inserted into the Rule Integration Data Table 54 is stored in the dedicated logistic table 55. In this example assume that the number of inserted Rules NB_INSERTED_RULES=3751. The Task Manager 90 then re-assumes control from the Pre-Data Collection sub-process 40.

A next step of the process is a determination of the number of Data Collection processes to be launched in parallel (i.e., the value of N is determined), followed by the launch of the N Data Collection process 3 of the Data Collection sub-process 60 by the Task Manager 90.

Figure 12A:
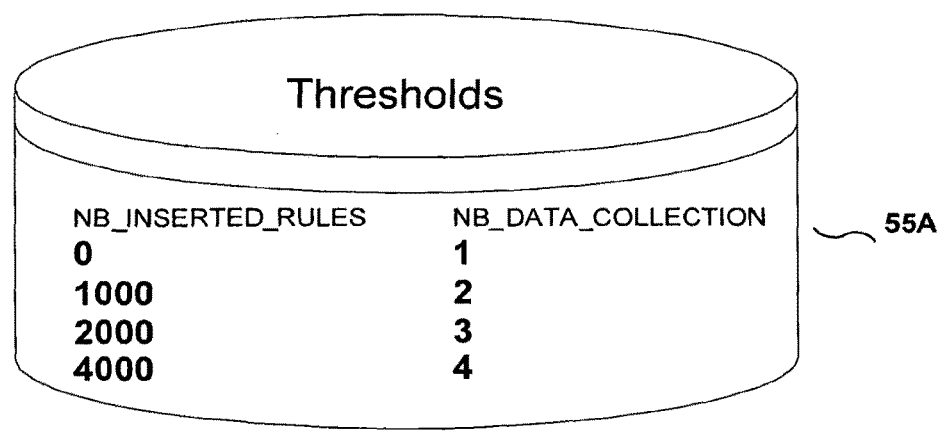
FIG. 12A shows an example of thresholds.

The Task Manager 90 takes into account the information stored in the logistic table 55 and compares the number of inserted Rules to certain thresholds that determine the number of Data Collection sub-processes to be launched. FIG. 12A shows an example of thresholds (NB_INSERTED_RULES) versus the number of Data Collection processes to be launched (NB_DATA_COLLECTION). For example, if NB_INSERTED_RULES=1050 then the value of N is set to 2, while for the case of NB_INSERTED_RULES=2500 the value of N is set to 3. In the example considered thus far, taking into account that NB_INSERTED_RULES=3751, the Task Manager 90 launches three Data Collection processes.

Figure 12B:
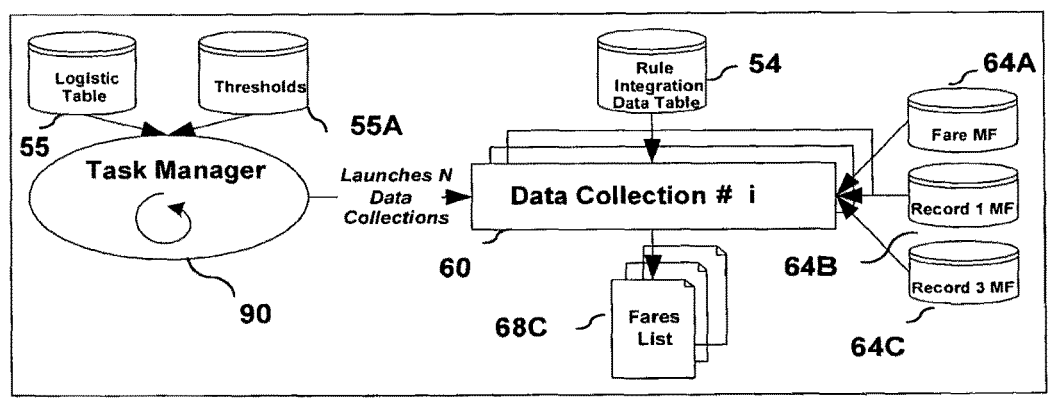
FIG. 12B is a diagram illustrating a launch of N DATA COLLECTION sub-processes, where the thresholds of FIG. 12A are shown as an input to a task manager.
Figure 13:
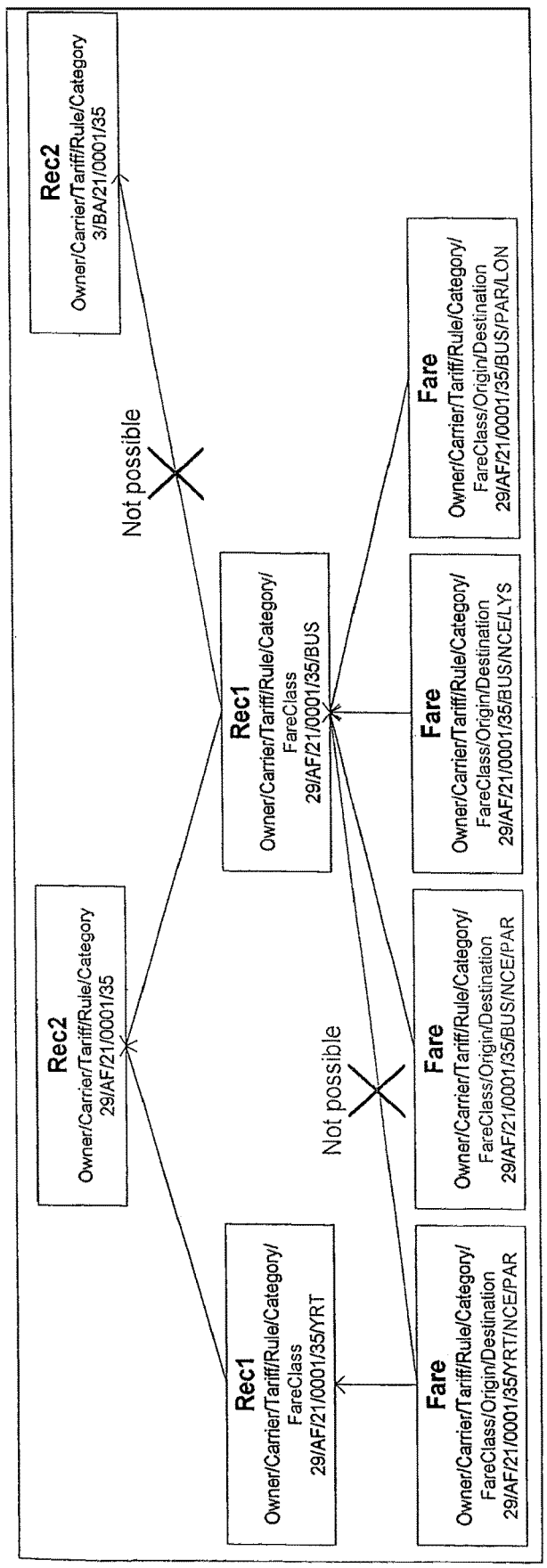
FIG. 13 shows an example of separate data domains.

FIG. 12B shows the launch of the sub-process 3 (Data Collection 60) by the Task Manager 90. Each launched Data Collection process obtains data from the Rule Integration Data Table 54 and reserves the Record2 Cat35 that it processes. By doing so the other Data Collection process(es) do not take these Rules into account and thus work on separate data domains. As such, by determining the domain of data to be treated via the Record2 it can be guaranteed that each Data Collection process will operate on different Record1, Fares, etc., as shown in FIG. 13.

Each Data Collection sub-process provides its output as the list 68C of Fares that have been validated by the process. The Task Manager 90 then re-assumes control from the N Data Collection processes 60.

Figure 14:
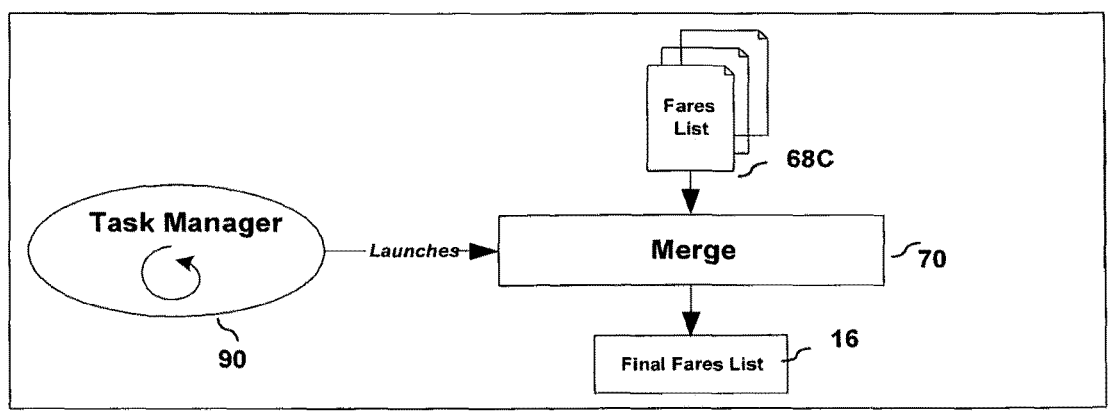
FIG. 14 is a diagram illustrating a launch of a MERGE sub-process.

FIG. 14 shows the launch of the sub-process 4 (Merge 70) by the Task Manager 90. The N Fares lists 68C generated by the N Data Collection processes are merged into the final Fares list 16. In this case three Fares lists 68C are merged into the final Fares list 16. As was noted above, the Merge sub-process 70 involves sorting and removing duplicates. The Task Manager 90 then re-assumes control from the Merge sub-process 70, and the final Fares list 16 can be stored and/or sent to a user.

In general, all data needed during the execution of the sub-processes 40-70 (e.g., Fare Application, Fares, other data such as Geography Properties, etc) are retrieved only when needed and then placed into data caches. Thus, using appropriate looping on Rules Provisions Keys, Fares Keys and Fare Application Keys, retrievals are factorized and reusable. As database accesses are costly in terms of processing time, reducing the number of calls to the database increases the execution speed of the process. Moreover, multiple and unnecessary data retrievals can be prevented which can lead to unnecessary memory usage.

Significant performance gains can be achieved through the use of the Fares Detection from Rules attributes process described above. This increase in performance can be illustrated by the use of a non-limiting example of a typical use case.

Use Case: Provide all Fares that a certain Vendor's A offices may sell on Europe/US-Canada markets. For an initial domain of data to be processed assume that there are 40,000,000 Fares, 400,000 Rules and 50,000,000 Rule Provisions.

By employing the Fares Detection from Rules attributes process described above the performance was found to be 1,500 Rules handled in 2 minutes and 15,000 Fares processed in 30 minutes, with four of the Data Collection processes 60 running in parallel (N=4). By contrast, this processing would require some number of days to complete if all fares were directly processed using the same hardware platform.

As opposed to the conventional Fare quotation process, the Fares Detection from Rules attributes process is accomplished starting from attributes located in the Rules to provide a list of Fares, ensuring that the Fares in the list would not be invalidated by the specified Rules attributes. The Fares Detection from Rules attributes process also provides a pricing-oriented functionality in a Database context that is capable of dealing with a large volume of data. However, and in spite of the large volume of data, performance issues are addressed (at least in terms of processing time and memory usage) using certain technical speed-up approaches as described above.

The exemplary embodiments can be in conjunction with, and can form the basis of, a number of valuable applications and tools including, but not limited to, monitoring, auditing and statistical evaluations.

Figure 15:
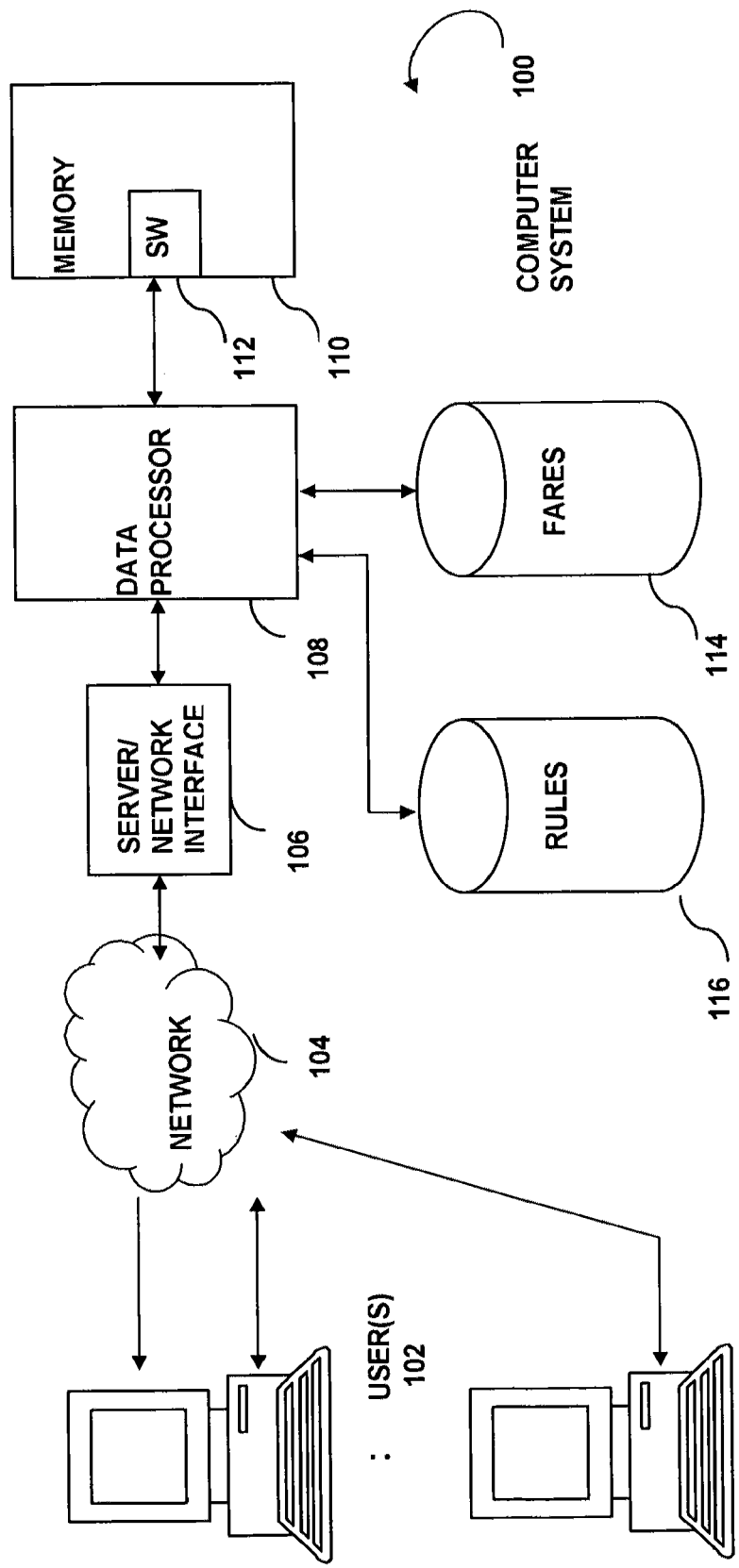
FIG. 15 is a simplified system-level block diagram showing various components that are suitable for implementing the exemplary embodiments of this invention.

Reference is made to FIG. 15 for showing a simplified system-level block diagram of various components that are suitable for implementing the exemplary embodiments of this invention. In FIG. 15 a computer system 100 includes a portal (server, network interface) 106 to a network 104 (e.g., the Internet) whereby users 102 can make Fare inquiries via respective user terminals, such as personal computers. Connected/coupled with the portal 106 is at least one data processor 108 having an associated memory 110 that stores data and software (SW) 112. The SW 112 contains program instructions that when executed by the data processor 108 results in performance of the method and processes as described above with respect to FIGS. 5-14. The various data caches, tables, thresholds, temporary storage and the like discussed above can be implemented in the memory 110. Also connected with the at least one data processor 108 is a Fares database 114 and a Rules database 116 containing Fare-related and Rule-related data that is processed as discussed above. Note that one or more of the databases 114, 116 may be remotely located and accessed through the network 104 and/or through one or more other networks. Note also that in some implementations there may be one database storing both the Fares and Rules data. A suitable database manager is assumed to present for populating the database(s) with data, revising the data as needed, and searching the database(s).

The data processor 108 may be implemented with a plurality of processing units capable of parallel execution during the performance of the Data Collection sub-process 60. These processing units may be embodied as physical processing units or as virtual processing units (virtual machines). The processing units are assumed to be under control of the Task Manager 90, which may be implemented by one or more modules of the SW 112.

In general the system 100 be implemented using one or more suitable computer hardware/software platforms, and can embodied as servers containing one or more data processors and associated memory storing computer software and data. The system 100 may be associated with, for example, a particular an organization (e.g., a GDS) that handles travel inquiries and booking reservations for passenger airlines. The users 102 may be, for example, represented as individual offices of various OLTAs, as was discussed above. The users 102 may also be, for example, associated with various passenger airlines.

The exact implementation details and the construction of the computer system 100 may take any number of suitable forms, and should not be construed as being limiting in any respect as to the implementation and practice of the exemplary embodiments of this invention.

The foregoing description has provided by way of exemplary and non-limiting examples a full and informative description of various method, apparatus and computer program software for implementing the exemplary embodiments of this invention. However, various modifications and adaptations may become apparent to those skilled in the relevant arts in view of the foregoing description, when read in conjunction with the accompanying drawings and the appended claims.

Furthermore, some of the features of the exemplary embodiments of this invention may be used to advantage without the corresponding use of other features. As such, the foregoing description should be considered as merely illustrative of the principles, teachings and embodiments of this invention, and not in limitation thereof.

What is claimed is:

1. A computer-implemented method comprising:
   in response to a first user specifying an attribute set including at least one rule attribute, performing a first search in a rule category database to retrieve rule categories corresponding to the attribute set;
   performing a second search in a rule provision database to retrieve rule provisions corresponding to the attribute set;
   identifying rules related to the rule categories retrieved from the rule category database and the rule provisions retrieved from the rule provision database, wherein identifying rules relating to the rule categories and the rule provisions comprises executing a pre-data collection sub-process that filters each retrieved rule to remove rules that are not applicable and stores surviving rules;
   performing a third search using the identified rules to retrieve, for each identified rule, fares corresponding to the identified rule from a fares database, wherein the third search is performed as N search processes that are executed in parallel;
   building a list of eligible fares that are not invalidated by the attribute set using the fares retrieved from the fares database, wherein the list of eligible fares is a merged list obtained from a list output from each of the N search processes;
   creating a functional index including one or more entries, each entry associating one of the rule categories to one or more of the eligible fares based on the corresponding attribute defined by the entry;
   associating the functional index with the attribute set; and
   in response to a second user specifying the attribute set, retrieving the fares from the fares database using the functional index.

2. The method of claim 1, wherein a value of N is determined based on a number of rules identified and on a set of predetermined thresholds, and N is an integer equal to one or greater than one.

3. The method of claim 1, wherein performing the third search comprises:
   executing a data collection sub-process as a plurality of parallel data collection sub-processes to retrieve, for each identified rule, the eligible fares from the fares database and generate a plurality of fare lists.

4. The method of claim 3, wherein executing the data collection sub-process comprises, for each of the plurality of parallel data collection sub-processes:
   retrieving, from a rule category sequence, a list of corresponding fare keys;
   for each fare key, retrieving a fare and an associated fare application entity, and merging matching rule category sequences to form a fare record;
   matching each fare record with rule category data and first rule provision data corresponding to the attribute set;
   matching each fare record against the rule category sequence and retaining the fare records identified during the first search;
   retrieving second rule provision data corresponding to the rule category sequence and matching the rule category data against the fare record and the attribute set; and
   only storing the fare record in a fare list where a match occurs, wherein the plurality of parallel data collection sub-processes operate on disjoint data domains to avoid performing redundant operations.

5. The method of claim 3, wherein building the list of eligible fares comprises:
   merging the plurality of fare lists into the list of eligible fares; and
   merging a fare list output from each of the plurality of parallel data collection sub-processes into the list of eligible fares by sorting and removing duplicate fare records.

6. The method of claim 1, wherein performing the second search to retrieve the rule provisions comprises:
   using direct matching of functional indices representing decoded rule-specific data; and
   using a data scanning accelerator to provide a direct association between the attribute set and the identified rules.

7. A computer program product comprising:
   a non-transitory computer-readable medium; and
   software program instructions stored on the computer-readable medium that, when executed by at least one processor, causes the at least one processor to:
   in response to a user specifying an attribute set including at least one rule attribute, perform a first search in a rule category database to retrieve rule categories corresponding to the attribute set;
   perform a second search in a rule provision database to retrieve rule provisions corresponding to the attribute set;
   identify rules related to the rule categories retrieved from the rule category database and the rule provisions retrieved from the rule provision database, wherein identifying rules relating to the rule categories and the rule provisions comprises executing a pre-data collection sub-process that filters each retrieved rule to remove rules that are not applicable and stores surviving rules;
   perform a third search using the identified rules to retrieve, for each identified rule, fares corresponding to the identified rule from a fares database, wherein the third search is performed as N search processes that are executed in parallel;
   build a list of eligible fares that are not invalidated by the attribute set using the fares retrieved from the fares database, wherein the list of eligible fares is a merged list obtained from a list output from each of the N search processes;
   create a functional index including one or more entries, each entry associating one of the rule categories to one or more of the eligible fares based on a corresponding attribute defined by the entry;
   associate the functional index with the attribute set; and
   in response to a second user specifying the attribute set, retrieve the fares from the fares database using the functional index.

8. A data processing system comprising:
   a processor;
   at least one memory connected with the processor and storing computer software that is executable by the processor;
   a rule category database, a rule provision database, and a fares database, each database coupled with the processor, the fares database storing a plurality of fares, and the rule category database and the rule provision database each storing a plurality of rules establishing conditions under which the fares can be applied; and
   an interface configured to receive an input from a first user specifying an attribute set including at least one rule attribute,
   wherein the processor is configured with the computer software to cause the data processing system to:
   in response to receiving the input, perform a first search in the rule category database to retrieve the rule categories corresponding to the rule attribute set;
   perform a second search in the rule provision database to retrieve rule provisions corresponding to the attribute set;
   identify rules related to the rule categories retrieved from the rule category database and the rule provisions retrieved from the rule provision database, wherein identifying rules relating to the rule categories and the rule provisions comprises executing a pre-data collection sub-process that filters each retrieved rule to remove rules that are not applicable and stores surviving rules;
   perform a third search using the identified rules to retrieve, for each identified rule, fares corresponding to the identified rule from the fares database, wherein the third search is performed as N search processes that are executed in parallel;
   build a list of eligible fares that are not invalidated by the attribute set using the fares retrieved from the fares database, wherein the list of eligible fares is a merged list obtained from a list output from each of the N search processes;
   create a functional index including one or more entries, each entry associating one of the rule categories to one or more of the eligible fares based on a corresponding attribute defined by the entry;
   associate the functional index with the attribute set; and
   in response to a second user specifying the attribute set, retrieve the fares from the fares database using the functional index.

9. The data processing system of claim 8, wherein a value of N is determined based on a number of rules identified and on a set of predetermined thresholds, and N is an integer equal to one or greater than one.

10. The data processing system of claim 8, wherein the processor is further configured with the computer software to cause the data processing system to perform the third search by executing a data collection sub-process as a plurality of parallel data collection sub-processes to retrieve, for each identified rule, the eligible fares from the fares database, and generating a plurality of fare lists.

11. The data processing system of claim 10, wherein the processor is further configured with the computer software to cause the data processing system to execute the data collection sub-process, for each of the plurality of parallel data collection sub-processes by:
   retrieving, from a rule category sequence, a list of corresponding fare keys;
   for each fare key, retrieving a fare and an associated fare application entity, and merging matching rule category sequences to form a fare record;
   matching each fare record with rule category data and first rule provision data corresponding to the attribute set;
   matching each fare record against the rule category sequence and retaining those fare records previously identified during the first search;
   retrieving second rule provision data corresponding to the rule category sequence and matching the rule category data against the fare record and the attribute set; and only storing the fare record in a fare list where a match occurs, wherein the plurality of parallel data collection sub-processes operate on disjoint data domains to avoid performing redundant operations.

12. The data processing system of claim 11, wherein the processor is further configured with the computer software to cause the data processing system to:

build the list of eligible fares by merging the plurality of fare lists into the list of eligible fares; and merge a fare list output from each of the plurality of parallel data collection sub-processes into the list of eligible fares by sorting and removing duplicate fare records.

13. The data processing system of claim 8, wherein the processor is further configured with the computer software to cause the data processing system to perform the second search to retrieve the rule provisions by:

using direct matching of functional indices representing decoded rule-specific data; and using a data scanning accelerator to provide a direct association between the attribute set and the identified rules.

* * * * *